United States Patent [19]

Dickson

[11] Patent Number: 4,790,612

[45] Date of Patent: Dec. 13, 1988

[54] METHOD AND APPARATUS FOR COPYING HOLOGRAPHIC DISKS

[75] Inventor: LeRoy D. Dickson, Raleigh, N.C.

[73] Assignee: International Business Machines Corporation, Armonk, N.Y.

[21] Appl. No.: 906,865

[22] Filed: Sep. 15, 1986

[51] Int. Cl.⁴ .................. G02B 5/32; G02B 26/10; G03B 27/00; G03H 1/30

[52] U.S. Cl. ................. 350/3.69; 350/3.71; 350/3.73; 350/3.78; 355/2

[58] Field of Search ............. 350/3.69, 3.71, 3.73, 350/629, 3.75, 3.78; 355/2

[56] References Cited

U.S. PATENT DOCUMENTS

| | | | |
|---|---|---|---|
| 3,226,557 | 12/1965 | Goodman | 350/629 X |
| 3,419,321 | 12/1968 | Barber et al. | 350/572 |
| 3,758,186 | 9/1973 | Brumm | 350/3.69 X |
| 4,151,752 | 5/1979 | Perdijon | 350/432 X |
| 4,170,396 | 10/1979 | Kraft | 350/3.73 X |
| 4,415,224 | 11/1983 | Dickson | 350/3.71 |
| 4,547,037 | 10/1985 | Case | 350/3.75 |
| 4,623,776 | 11/1986 | Buchroeder et al. | 350/629 X |

Primary Examiner—John K. Corbin
Assistant Examiner—David J. Edmondson
Attorney, Agent, or Firm—Gerald R. Woods

[57] ABSTRACT

A multi-faceted holographic disk can be copied in a one-step process by using a source disk, actually a sandwich of two thin film layers of photosensitive material. The first thin film layer is capable of producing multiple reference beams simultaneously. The second thin film layers is a "master" copy of the disk to be copied. Both layers are produced using known off-axis holographic techniques. A target disk, having an unexposed film of photosensitive material is located ajacent the second thin film layer. The source disk is illuminated with coherent light, preferably in the form of a conical beam with an apparent point of origin on an axis through the common centers of the source and target disks. Several optical elements capable of producing the conical beam are illustrated.

9 Claims, 2 Drawing Sheets

METHOD AND APPARATUS FOR COPYING HOLOGRAPHIC DISKS

TECHNICAL FIELD

The present invention relates to optical systems and more particularly to a method and apparatus for copying holographic disks.

BACKGROUND OF THE INVENTION

A known type of optical scanner uses a rotating holographic disk as a beam deflecting element. The disk includes a circular glass substrate which supports an annular thin film divided into individual beam deflecting generally sectorial areas or facets. The thin film is an exposed and developed photosensitive material, such as a silver halide emulsion or a dichromated gelatin. The original of each facet in the annulus is exposed using known off-axis, holographic techniques. According to these techniques, two beams of coherent light, a reference beam and an object beam, are directed at a film of unexposed, photosensitive material. The overlapping beams create optical interference patterns in the layer of photosensitive material. These interference patterns are fixed by developing the material using conventional techniques suitable for the particular photosensitive material employed. If the material is then illuminated with a reconstruction beam which is the conjugate of the original reference beam, the thin film will diffract or bend part of the reconstruction beam to produce the conjugate of the original object beam.

For purposes of this description, a conjugate of a light beam may be defined as follows. All the rays of a conjugate beam are opposite to the rays of the original beam. That is, if rays in the original beam diverge from a single point, then rays in the conjugate of this beam will travel in the opposite direction and converge to that same point.

If the thin film is moved relative to the reconstruction beam, the conjugate of the object beam will sweep through an arc. The particular path followed by the conjugate beam is a function of the relative orientation of the original reference beam and original object beam at the time of exposure of the initial facet. By using different angles and orientations of original reference beams and original object beams, reconstructed object beams following different paths can be generated by different facets. Arrays of beam-folding mirrors can be located in the paths of the reconstructed object beams to redirect the object beams into complex, omni-directional scan patterns.

Multi-faceted holographic disks of the type described above can be made by exposing individual, oversized sheets of photosensitive material and by developing these sheets separately. Individual facets of the desired size and shape can be cut from the sheets and bonded to the clear glass substrate with a suitable adhesive material.

The steps of individually exposing a separate sheet of photosensitive material for each facet, cutting the facet to the correct dimensions, positioning the facet in the correct place on the clear glass substrate and bonding the facet to that substrate are obviously time consuming, labor intensive and subject to errors. These factors make this "cut and paste" type of disk fabrication unsuitable for anything other than extremely limited quantities of disks. A disk made by the "cut and paste" method described above is normally used only as a master disk.

To provide large quantities of holographic disks, the master disk itself may be used in a multi-step copying process, sometimes referred to as a step and repeat process. In a step and repeat process, an annular thin film of photosensitive material (a target disk) is placed face to face with the thin film of the master disk. All facets, except one, on the master disk are masked from any ambient light. The unmasked facet is illuminated using a collimated reference beam directed at the surface of the master disk at the same angle as the reference beam originally used in producing the facet on the master disk. When this reference beam is transmitted through the exposed facet on the master disk, the exposed facet will separate the beam into a zero order component, which is basically an extension of the reference beam, and a first order component, which follows the path of the original object beam. The zero and first order components of the beam will interfere in the previously undeveloped thin film to form an interference pattern in the target film. The area of the target film in which the interference pattern is formed corresponds to the area of the unmasked facet on the master disk.

Once a facet has been generated in the target disk using these steps, the exposed area is masked from any light and a different facet on the master disk is unmasked. The interference pattern recorded in this next facet is copied into the target film using a reference beam having the same orientation as the reference beam originally used to generate this next facet.

These steps are repeated one facet at a time for each facet in the master disk until the interference pattern of each facet has been copied into the target film. At this point, the target film is developed in a single processing operation.

While this "step and repeat" method is superior to the cut and paste method for manufacturing holographic disks in large quantities, it still has disadvantages. The step and repeat method takes an undesirable amount of time since each facet must be exposed in a separate operation, the facet area masked must be changed for each exposure operation, and; the orientation of the reference beam may have to be changed for successive exposure operations. All of these operations require intervention by a human operator or, as an alternative, a highly automated system capable of performing such operations. The costs of developing an automated system diminish the attractiveness of that alternative.

SUMMARY OF THE INVENTION

The present invention is an apparatus and method which permits a multi-faceted holographic disk to be copied in a one-step process.

The apparatus includes a source disk having a first layer of light transmitting material capable of producing multiple, collimated reference beams simultaneously and a second adjacent layer of light transmitting material. The second layer comprises the multi-faceted holographic disk to be copied or replicated. The apparatus further includes a coherent light source which is positioned on a normal from the center of the source disk. The light source illuminates a substantial portion or all of the first layer of the source disk with coherent light. Means are provided for positioning a target disk, having a third layer of unexposed photosensitive material adjacent the second layer of the source disk. When the coherent light source is energized, the image which is produced in the target disk replicates that portion of the second layer in the source disk which is illuminated by the multiple reference beams generated by the first layer of the source disk.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following technical description when read in conjunction with the accompanying drawings wherein:

TECHNICAL DESCRIPTION

Figure 1:
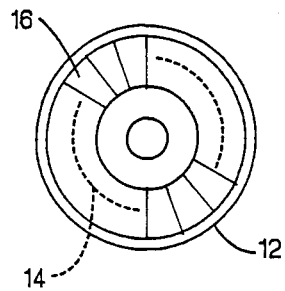
FIG. 1 is a partial top view of a holographic disk of the type which can be replicated in a single step by the present invention.

Referring to the drawings, FIG. 1 is a partial top view of a multi-faceted holographic disk 10 comprising a circular glass substrate 12 which supports a thin film 14 of material. The thin film is divided into a plurality of sectorial facets, such as facet 16, which have been generated using known off-axis holographic techniques. Only a few of the facets which actually exist are shown. In practice, facets occupy the entire annular area of the thin film. The disk 10 is preferably driven directly by an electric motor (not show:) having an output shaft aligned with the center of hub area 18 on the disk.

The disk structure shown in FIG. 1 is not per se part of the present invention and is not to be described in detail. Further details
of such a disk may be found in U.S. Pat. No. 4,415,224, which is assigned to the assignee of the present invention.

Figure 2:
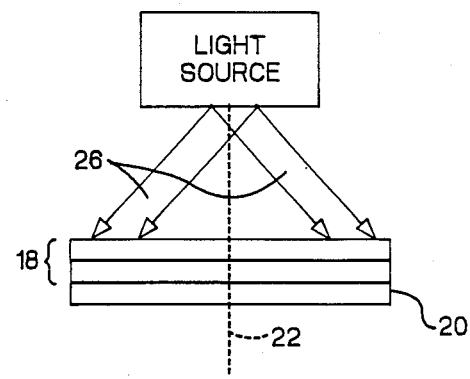
FIG. 2 is a schematic representation of the primary components of the one-step copying apparatus.

FIG. 2 is a simplified, partially schematic drawing of an apparatus for practicing the present invention. The apparatus includes a source disk 18, which is actually a sandwich of two different layers of thin film, as will be described in more detail later. The first layer is a reference-beam-generating layer capable of producing multiple reference beams simultaneously while the second layer contains the facets to be copied. A target disk 20 is aligned with the source disk 18 on a common axis 22. The apparatus further includes a light source 24 capable of illuminating either all or a substantial portion of the upper surface of source disk 18 with coherent light. In a preferred embodiment, light source 24 produces a conical light beam, represented by rays 26, which limits light produced by source 24 to an annular area on the surface of the source disk 18. When viewed along axis 22, the light pattern would have an annular cross section.

As mentioned above, the source disk 18 is a sandwich of two thin film layers. Both layers have the same pattern of facets. The facets in the two layers serve different purposes, however. The facets in the first or upper layer are used to generate multiple reference beams simultaneously with each reference beam having a predetermined angle relative to the facet surface.

Figure 3:
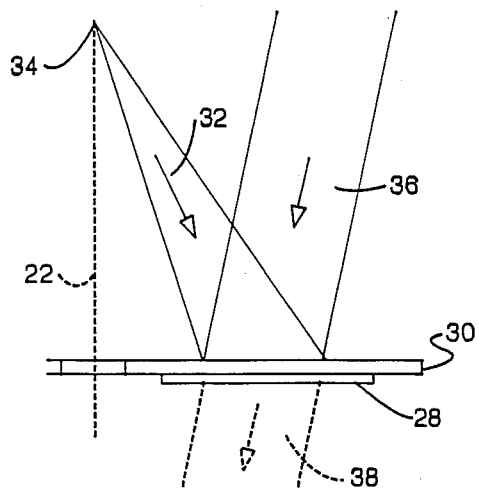
FIG. 3 shows particular orientations of reference and object beams used in producing one of the facets in the first layer of the source disk.

Each facet in the first layer is produced by exposing a photosensitive material to two overlapping beams of coherent light using off-axis techniques. This is illustrated in FIG. 3 for one particular facet. The first layer in the source disk is a thin film 28 adhered to the lower surface of glass substrate 30. A step and repeat process of the type described earlier may be used to expose each facet in the film 28. A reference beam 32 which appears to originate at a point 34 on the axis 22 is directed at the film 28 in a particular facet area. A collimated object beam 36 is directed at the film 28 and overlaps the reference beam 32 in the selected facet area. While any one facet area in the film 28 is being exposed to the reference and object beams, all other facet areas are masked from any light. For each facet, the reference beam 32 appears to originate at the same point 34 in the axis 22. The object beams may, however, be directed at the film 28 at different angles relative to the surface of the film. When the film 28 has been completely exposed and developed, illumination of a given facet area by a reconstruction beam originating at point 34 will produce a beam 38 which is directed along the same path as the original object beam 36. The beam 38 serves as a reference beam which can be used in a one step copying process.

Although not shown in FIG. 3, illumination of a facet area by a reconstruction beam produces both a first order beam represented by beam 38 and a zero order beam (not shown) which is an extension of the reconstruction beam originating at point 34. The steps of exposing and developing the first layer 28 would be controlled in accordance with known film processing techniques to maximize the efficiency of the film 28; that is, to make the first order beam as strong as possible relative to the zero order beam.

The second thin film layer 44 in the source disk 18 contains the holographic disk which is to be copied. This layer can be made using conventional off-axis holographic techniques and some form of the cut and paste process described earlier.

Figure 4:
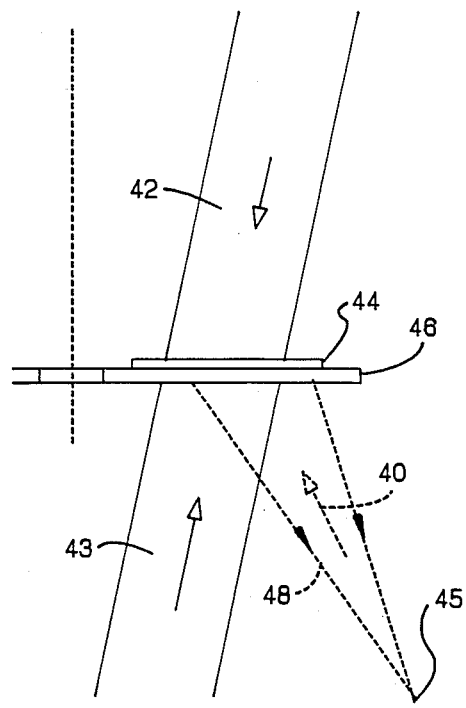
FIG. 4 shows particular orientations of reference and object beams used in producing one of the facets in the multi-faceted holographic disks to be replicated, that is, in the second layer of the source disk.

FIG. 4 shows the light beams which would be used to originally expose one facet on the second layer 44, which is adhered to a glass substrate 46. In a preferred embodiment of the invention, the object beam is a diverging beam 40 having an apparent point source 45 while the reference beam is a collimated beam 43 which overlaps the object beam in a limited facet area in the thin film 44. The angles of the object beam 40 and reference beam 42 relative to the surface of the film 44 determine the path which will be followed by a reconstructed conjugate of the object beam 40 when the film 44 is later illuminated by a collimated reconstruction beam 42. The reconstructed conjugate will appear to originate at the disk and to be focused at point 45.

Figure 5:
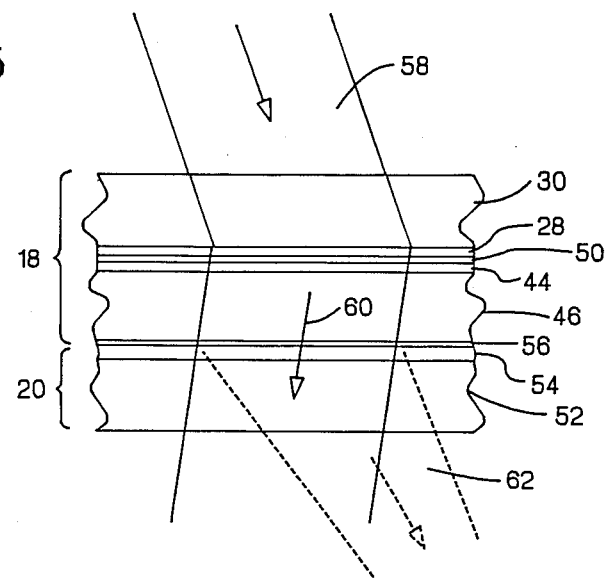
FIG. 5 is an edge view of a source disk adjacent a target disk during the copying process.

It is important to note that, for a given facet, the orientation of the reference beam 43 used in exposing a facet in the second layer 44 disk should be the same as the orientation of the object beam 36 used in exposing the corresponding facet in the first layer. The reason for this is explained with reference to FIG. 5 which shows limited areas of the source disk 18 and of the target disk 20 as they are positioned for the actual copying operation. FIG. 5 shows that the source disk 18 is actually a sandwich in which the reference-beam-generating first layer 28 and the second layer 44 are placed face to face preferably with an interposed film 50 of index matching adhesive. The index matching adhesive reduces reflection losses at the interface between the layers 28 and 44. The target disk 20 includes a glass substrate 52 which supports an unexposed layer 54 of photosensitive material. The thin film 54 of unexposed material is positioned adjacent the bottom surface of the source disk 18, preferably with a layer 56 of index matching fluid for reducing reflection losses.

In the actual copying process, the source disk 18 is illuminated with a coherent light beam 58 which appears to originate on the axis of the disk 18. When the rays in beam 58 strike the thin film layer 28 in disk 18, each facet area in the film layer 28 will diffract a substantial portion of the impinging optical energy to form multiple reference beams which will impinge on the layer 44 of the source disk 18. A substantial portion of the optical energy in the beam 58 will be directed into the thin film 44 along the path indicated by arrow 60. Thin film 44 will generate both a zero order beam directed along the axis 60 and a first order beam (not shown) which will be centered on an axis dependent upon the optical geometry employed in making the particular facet area in film 44. The zero order and first order beams overlap and interfere in the thin film layer 54 of the target disk to produce interference patterns in the given facet area. Every facet in the target disk can be exposed simultaneously since multiple reference beams are generated simultaneously.

After the one-step exposure process, the target disk 20 can be developed using conventional techniques. When target disk 20 is later illuminated with a collimated reconstruction beam which impinges on the surface of the thin film 54 at the angle of incidence of the conjugate of the object beam 42 used in making the source disk, a scan line 62 is generated which is a conjugate of the reference beam 40 used in making the source disk. As shown in FIG. 5, the generated beam 62 is preferably a converging beam.

Figure 6:
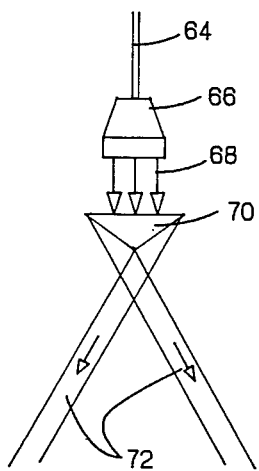
FIGS. 6 through 8 show different types of conical elements capable of generating a conical light beam preferably employed during the copying process.
Figure 7:
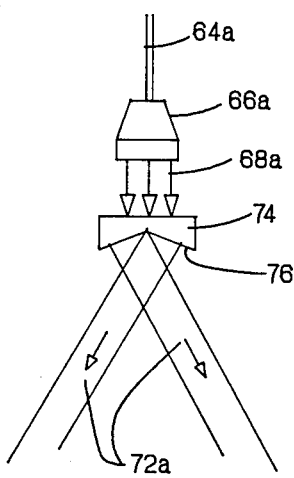
Figure 8:
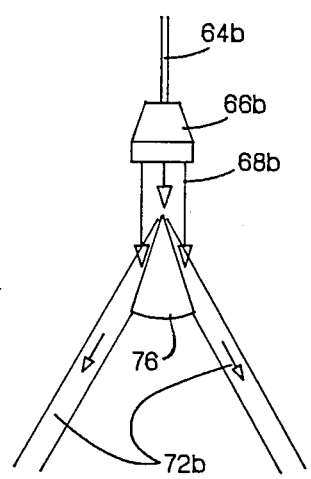

The conical beam produced by light source 24 can be generated using a number of different optical elements. FIGS. 6–8 show three suitable elements. Referring first to FIG. 6, the collimated laser beam 64 produced by a conventional laser is directed at a conventional beam expander 66 which increases the diameter of the laser beam while maintaining its collimation. The expanded beam 68 is directed at a conical prism 70 which appears triangular but is actually itself conical when viewed in three dimensions. The prism 70 refracts the optical energy in expanded beam 68 to form a cone of light represented by rays 72.

FIG. 7 discloses another type of conical element. In FIG. 7, the original laser beam 64A, beam expander 66A, expanded beam 68A and the conical rays 72A are intended to be identical to the correspondingly numbered elements in FIG. 6. The only element that differs is the conical prism 74. Prism 74 has an inverted conical surface 76 which is the optical equivalent of the normal conical surface on element 70.

FIG. 8 shows another embodiment in which the light beams and the beam expander are intended to be identical to those shown in FIGS. 6 and 7. This identity is indicated by the use of the same numbering scheme for the corresponding elements but with the suffix "B" attached to each number. In FIG. 8, a conical reflector 76 is used to generate the conical light pattern 72B.

While there have been described what are considered to be preferred embodiments of the invention, variations and modifications in those embodiments will occur to those skilled in the art once they learn of the invention through the foregoing technical description. For example, while the description contemplates a one step copying process, it is entirely possible that substantial benefits could still be realized if the process were used to copy disks in two or more steps since the number of copy steps would still be considerably less than the number of steps required for a facet-by-facet copying process. Therefore, it is intended that the appended claims shall be construed to include not only the preferred embodiments but all such variations and modifications as fall within the true spirit and scope of the invention.

I claim:

1. Apparatus for replicating a multi-faceted holographic disk comprising:
   a source disk having a first layer of light-transmitting, developed photosensitive material capable of producing multiple, collimated reference beams simultaneously, and a second adjacent layer of light-transmitting developed photosensitive material, said second layer being the multi-faceted holographic disk to be replicated;
   a coherent light source positioned on a normal from the center of the source disk, said light source being capable of illuminating a predetermined portion of the first layer in said source disk with coherent light at a predetermined angle relative to the normal; and
   means for positioning a third layer of unexposed photosensitive material adjacent the second layer of the source disk.

2. Apparatus as defined in claim 1 wherein said coherent light source further comprises:
   means for producing a collimated beam of coherent light directed toward the copying disk along the normal from the center of the disk; and
   conical means located on the normal for redirecting the collimated beam to produce a conical pattern of light, said pattern having an annular cross section in a plane parallel to the surface of the source disk.

3. Apparatus as defined in claim 2 wherein said conical means comprises a light transmitting conical prism having a light refracting surface for redirecting the collimated beam to produce the conical light pattern.

4. Apparatus as defined in claim 2 wherein said conical means comprises a light reflecting cone centered on the normal from the center of the source disk, the surface of said cone reflecting the collimated beam to produce the conical light pattern.

5. Apparatus as defined in claim 2 further including a beam expander interposed between the coherent light source and the conical means.

6. A method of copying a multi-faceted holographic disk comprising the steps of:
   placing a source disk in a predetermined position on an axis extending along a normal through the center of the disk, said disk having a first layer of light transmitting material capable for producing multiple collimated reference beams simultaneously and a second, adjacent layer of light transmitting material, said second layer being the multi-faceted holographic disk to be copied;

placing a third layer of unexposed photosensitive material adjacent the second layer of the copying disk; and illuminating a predetermined portion of the first layer of the source disk with a coherent light pattern having an annular cross section.

7. A method as defined in claim 6 further including the steps of coating the third layer with an index matching fluid before placing it adjacent the second layer.

8. A method as defined in claim 6 wherein the illuminating step comprises the step of directing a collimated, coherent beam along the axis through the center of the source disk and interposing a conical element centered on the axis to redirect the collimated, coherent beam to form a light pattern having an annular cross section.

9. A method as defined in claim 10 including the further step of expanding the collimated, coherent beam before the beam impinges on the conical element.

* * * * *